Patented July 9, 1929.

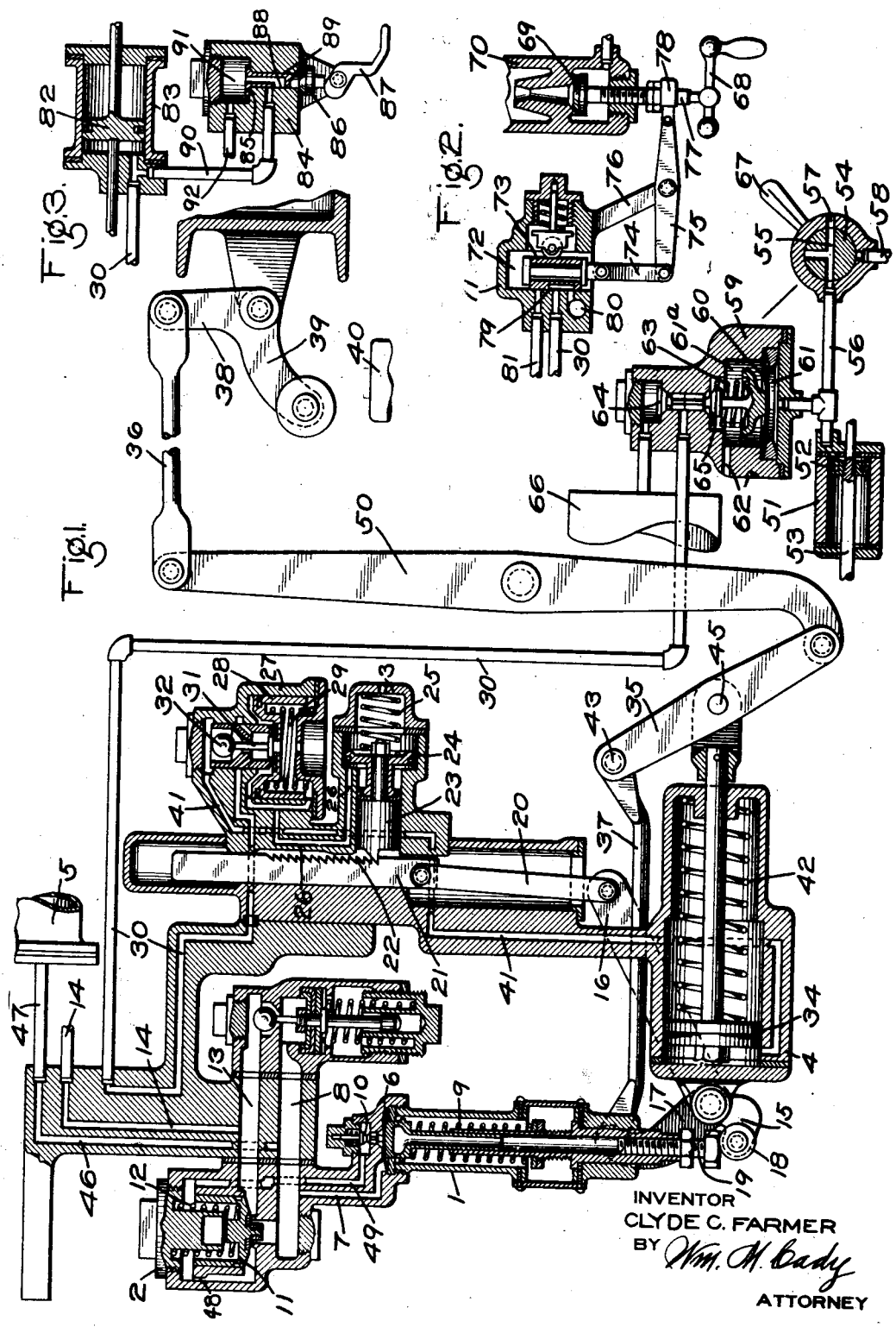

1,720,266

UNITED STATES PATENT OFFICE.

CLYDE C. FARMER, OF PITTSBURGH, PENNSYLVANIA, ASSIGNOR TO THE WESTING-HOUSE AIR BRAKE COMPANY, OF WILMERDING, PENNSYLVANIA, A CORPORATION OF PENNSYLVANIA.

VARIABLE-LOAD APPARATUS.

Application filed August 5, 1927. Serial No. 210,843.

This invention relates to devices for varying the braking power on a vehicle according to the load and has for its principal object to provide a variable load brake apparatus and controlling means adapted for regulating the braking power on the tender of a locomotive.

In the accompanying drawing; Fig. 1 is a diagrammatic view of a variable load brake apparatus embodying my invention; Fig. 2 a detail view, showing a modified form of my invention; and Fig. 3 a detail view, showing another form of my invention.
The variable load brake apparatus proper may be of the type shown in my Patent No. 1,572,196, dated February 9, 1926, though the application of my invention is not limited to any particular type of variable load brake mechanism, and I will first describe same and will then describe the application of my invention thereto.

The variable load brake mechanism as shown in the drawing comprises a brake cylinder pressure limiting valve device 1, a brake cylinder supply valve device 2, a locking mechanism 3, a strut cylinder 4, and a brake cylinder 5.

The brake cylinder pressure limiting valve device 1 may comprise a flexible diaphragm 6, which is subject on one side to the pressure of fluid in the brake cylinder 5, as supplied through passage 7 from chamber 8, and on the opposite side to the pressure of a coil spring 9. A plunger 19 engaging the free end of the spring 9 is provided in order to vary the pressure exerted by said spring. The flexible diaphragm 6 is adapted to operate a valve 10, which controls the operation of the brake cylinder supply valve 2.

The brake cylinder supply valve 2 may comprise a valve piston 11 subject on one side to the pressure of a spring 12 and on the inner seated area of the opposite side to the pressure of fluid in a chamber 13, which is connected by passage and pipe 14 to the service port of the brake application valve, (not shown).

Pivotally mounted on the cap of the strut cylinder 4 is a crank arm member having crank arms 15, 16, and 17. A roller 18 pivotally mounted on the crank arm 15 is adapted to engage one end of the plunger 19 for effecting an adjustment of the spring 9, according to the load on the car.

The crank arm 16 is connected by link 20 to a ratchet bar 21, which is slidably mounted in the locking mechanism casting. The teeth 22 of the ratchet bar 21 are engageable by a pawl 23, which is operatively connected to a piston 24. The piston 24 is subject on one side to the pressure of a spring 25 and on the opposite side to the pressure of fluid as supplied through passage 26 from a valve device 27.

The valve device 27 may comprise a valve piston 28 subject on one side to the pressure of a spring 29 and on the inner seated area of the opposite side to the pressure of fluid in passage and pipe 30, through which fluid under pressure is supplied for operating the piston 34. Secured to the seating face of the valve piston 28 is a stem member 31, which engages a ball check valve 32 and is adapted when said valve piston is held seated by the spring 29 to hold the ball check 32 from its seat.

The strut cylinder 4 is carried by the locking mechanism casting and contains a piston 34, the stem of which is pivotally connected to a lever 35. The lever 35 is pivotally connected at one end to a lever 50, the opposite end of which is connected to a rod 36, and at the other end to a rod 37, which in turn is pivotally connected to the crank arm 17. The outer end of the rod 36 is pivotally connected to one arm 38 of a bell crank, which is mounted on the car body. The other arm 39 of the bell crank is adapted upon movement of the rod 36 to engage a member 40 mounted on the car truck.

In operation, when fluid under pressure is supplied to pipe and passage 30, the valve piston 28 being held seated by the spring 29, fluid from passage 30 flows past ball check 32 to passage 41 and thence to the strut cylinder 4.

The fluid under pressure building up in cylinder 4 forces the piston 34 outwardly against the pressure exerted by spring 42. The pawl 23 being held in engagement with teeth 22 of latch bar 21, by the spring 25, the crank arms 15, 16, and 17 are held against movement, so that the pivot pin 43 will act as a fulcrum for the lever 35, and the outward movement of piston 34 will push the rod 36 so as to bring crank arm 39 into engagement with the member 40.

The spring 29 is of such resistance as to hold the valve piston 28 seated, against the pressure of fluid acting on the inner seated area of the opposite side, until the pressure of fluid in the strut cylinder 4 and consequently on the inner seated area of said valve piston has built up sufficiently to move the piston 34 outwardly, at which time said valve piston will be unseated against the pressure exerted by the spring 29.

The unseating of valve piston 28 permits the ball check 32 to seat, thereby preventing back flow of fluid from cylinder 4 and at the same time opens communication from passage 30 through passage 26, to one side of piston 24. The fluid under pressure supplied from passage 30 acting on piston 24 moves said piston to the right against the pressure exerted by the spring 25 so as to disengage the pawl 23 from the teeth 22 of ratchet bar 21.

If the load on the vehicle is now increased, the car springs will be compressed, so that the member 40 acting on the arm 39 will cause a clockwise movement of the bell crank, which exerts a force through the rod 36 to cause a clockwise rotation of the lever 35, with the pivot pin 45 acting as a fulcrum. The rod 37 then acts to rotate crank arm 17 so as to rock the crank arm 15 in a clockwise direction, forcing the plunger 19 upwardly to compress the spring 9 correspondingly with the increase in load.

When the vehicle has been loaded, pipe 30 is vented to the atmosphere, so that fluid acting on the latch piston 24 may flow through passage 26 past unseated valve piston 28, thence through passage and pipe 30 to atmosphere, thereby permitting the spring 25 to force the piston 24 to the left and cause pawl 23 to engage the teeth of rack bar 21.

The ball check 32 prevents the escape of fluid from the strut cylinder 4 until after the pressure in the passages 26 and 30 has been reduced to a degree slightly less than the pressure exerted by spring 29, at which time said spring will seat the valve piston 28, thereby unseating ball check 32 and permitting fluid from cylinder 4 to flow to atmosphere by way of passages 41 and 30.

It will now be seen that the piston 34 is maintained in its outermost position until after the piston 24 has moved to the left, causing pawl 23 to engage the teeth 22 of the ratchet bar 21, thereby locking the mechanism in adjusted position.

If a service brake application is effected in order to bring the car to a stop, fluid under pressure from the brake application valve (not shown) will be supplied through pipe 14 to chamber 13, where it acts on the exposed area of valve piston 11. Said valve piston is then unseated, permitting fluid to flow to chamber 8, thence through passage 46 and pipe 47 to the brake cylinder 5.

Fluid from chamber 13 also equalizes through choked port 48 to the spring side of valve piston 11 and escapes therefrom through passage 49, past unseated valve 10, through passage 7 to chamber 8, and thence through passage and pipe 47 to the brake cylinder 5.

The pressure of fluid supplied to the brake cylinder is also supplied through passage 7 to diaphragm 6 and when the pressure in the brake cylinder has been increased to a predetermined degree, corresponding with the previous adjustment of spring 9 in accordance with the load on the car, said diaphragm will be moved downwardly, permitting the valve 10 to be seated by its spring.

Since the seating of the valve 10 prevents further escape of fluid under pressure from the spring side of the valve piston 11, fluid quickly equalizes on opposite sides thereof, so that the spring 12 will seat said valve piston and prevent further flow of fluid under pressure to the brake cylinder.

According to my present invention, the fluid under pressure for controlling the cutting into operation of the variable load mechanism as supplied through pipe 30 is controlled from the locomotive cab. In the construction shown in Fig. 1, the variable load mechanism is shown as controlled with the locomotive stoker.

With certain types of locomotive stokers, a steam cylinder 51 is provided, containing a piston 52 for operating a rod 53, the movement of which causes the stoker to operate. The supply and exhaust of steam to and from the piston 52 is controlled by a hand operated valve 54, having one position in which a port 55 connects the piston 52 through pipe 56 with an exhaust port 57, and another position in which the port 55 connects pipe 56 with a steam supply pipe 58.

I provide a valve device adapted to be controlled by the pressure of steam supplied through pipe 56 and comprising a casing 59 containing a flexible diaphragm 60, having the chamber 61 at one side, connected to pipe 56 and having the chamber 61ª at the opposite side open to the atmosphere through a port 62. The diaphragm is subject to the pressure of a coil spring 63 and is adapted to operate double beat valves 64 and 65. When the valves 64 and 65 are in the position shown in the drawing, the valve 64 is seated and the valve 65 is open, so that the pipe 30 is connected to exhaust port 62. When the valves are shifted by the diaphragm 60, the valve 65 is seated and the valve 64 is unseated, so that fluid under pressure is supplied from a source of fluid under pressure, such as the reservoir 66, to the pipe 30.

In operation, when the engineer operates the valve 54 by the handle 67, so as to cause the stoker to operate, steam supplied through pipe 56 to the piston 52 is also supplied to the diaphragm 60. The diaphragm 60 is then moved upwardly, so as to seat the valve 65 and unseat the valve 64.

Fluid under pressure is thus supplied to pipe 30, and, as hereinbefore described, the variable load mechanism is cut into operation, so that the brakes on the tender, when applied, will be applied at a pressure corresponding with the load on the tender.

When the handle 67 is moved back to the position shown in the drawing, the pipe 30 is vented to the atmosphere by way of valve 65, and exhaust port 62, so that, as hereinbefore described, the load mechanism will be locked in its load adjusted position.

In Fig. 2 of the drawing, a construction is shown, wherein the control of the variable load mechanism is associated with the usual injector control. The handle 68 is the usual handle for operating the steam valve 69 of the injector 70. A valve device is provided comprising a casing 71 having a valve chamber 72 containing a slide valve 73. The valve 73 is connected through a link 74 with one end of a lever 75, fulcrumed on a lug 76 carried by the casing 71 and having its other end pivotally connected to a collar 78, mounted on the valve operating rod 77.

When the injector is not operating, the stem 77 is in the position shown in the drawing, and the slide valve 73 is held in a position, in which the pipe 30 is connected, through a cavity 79 in the valve, with an exhaust port 80.

When the handle 68 is operated to cause the injector to operate, the slide valve 73 is operated by the movement of the stem, so that the cavity 79 in the slide valve, connects pipe 30 with pipe 81, leading to the main reservoir 66 or other source of fluid under pressure, and, as will be evident from the previous description, the variable load brake mechanism is then cut into operation.

According to the construction shown in Fig. 3, the variable load control means is associated with the fire door controlling means.

In this case, the piston 82, contained in cylinder 83, is adapted to control the fire door. For controlling the fluid pressure for operating the piston 82, a valve device is provided comprising a casing 84 in which is mounted double beat valves 85 and 86 adapted to be operated by a cam handle 87.

Normally the handle 87 is in the position shown in the drawing and the valve 85 is held closed while the valve 86 is unseated. When it is desired to open the fire door, the handle 87 is operated, so as to move the valve 86 to its seat and unseat the valve 85. In this position, a port 88, in the valve stem 89 connects pipe 90 leading to the cylinder 83, with chamber 91 which is connected to a fluid pressure supply pipe 92.

The pipe 30 is also connected to the cylinder 83, so that when fluid under pressure is supplied by operation of the handle 87, to operate the piston 82, fluid under pressure is also supplied to pipe 30, so that the variable load brake mechanism is adjusted according to the load on the vehicle.

It will thus be seen that I have provided means associated with some part in the locomotive cab, which is occasionally moved, for causing the variable load brake mechanism to be cut into operation, so as to adjust same in accordance with the load on the vehicle.

Having now described my invention, what I claim as new and desire to secure by Letters Patent, is:

1. In a fluid pressure brake, the combination with a variable load brake mechanism applied to the tender of a locomotive and adapted to be operated by fluid under pressure, of means in the locomotive cab for controlling a stoker, and means operable when said stoker is operated for supplying fluid under pressure to said variable load brake mechanism.

2. In a fluid pressure brake, the combination with a variable load brake mechanism applied to the tender of a locomotive and adapted to be operated by fluid under pressure, of a piston operated by steam pressure for controlling a locomotive stoker, a manually operable valve for controlling the supply of steam to said piston, and means operated by steam supplied to said piston for supplying fluid under pressure to said variable load brake mechanism.

3. The combination with a brake mechanism on a vehicle of a train for automatically varying the braking power according to the load on the vehicle and mechanism for cutting said brake mechanism into and out of control by the load on the vehicle, of means on the locomotive, operable by the engineer, for controlling the operation of said mechanism.

In testimony whereof I have hereunto set my hand.

CLYDE C. FARMER.